US012696258B2

(12) United States Patent
Krasniqi et al.

(10) Patent No.: US 12,696,258 B2
(45) Date of Patent: Jul. 28, 2026

(54) SERVICE SPECIFIC BEAM RADIO FREQUENCY BEAM OPTIMIZATION FOR 5G NETWORKS

(71) Applicant: T-MOBILE INNOVATIONS LLC, Overland Park, KS (US)

(72) Inventors: Gezim Krasniqi, Issaquah, WA (US); Alan Denis MacDonald, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 672 days.

(21) Appl. No.: 17/988,572

(22) Filed: Nov. 16, 2022

(65) Prior Publication Data

US 2024/0163858 A1 May 16, 2024

(51) Int. Cl.
*H04W 72/044* (2023.01)

(52) U.S. Cl.
CPC ................................. *H04W 72/046* (2013.01)

(58) Field of Classification Search
CPC ................................................... H04W 72/046
See application file for complete search history.

(56) References Cited

U.S. PATENT DOCUMENTS

| | | | | |
|---|---|---|---|---|
| 10,085,109 B2 * | 9/2018 | Kodaypak | ............... | H04W 4/70 |
| 11,696,208 B1 * | 7/2023 | Manning | ............... | H04W 48/18 |
| | | | | 370/329 |
| 2017/0135099 A1 * | 5/2017 | Song | ..................... | H04W 76/25 |
| 2017/0303259 A1 * | 10/2017 | Lee | ......................... | H04W 28/16 |
| 2018/0220317 A1 * | 8/2018 | Yilmaz | .................. | H04W 24/08 |
| 2018/0249513 A1 * | 8/2018 | Chang | ................... | H04W 28/00 |
| 2019/0357130 A1 * | 11/2019 | Garcia Azorero | .... | H04W 12/06 |
| 2021/0105847 A1 * | 4/2021 | Prabhakar | ............. | H04W 36/26 |
| 2021/0120484 A1 * | 4/2021 | Thorat | ............. | H04W 28/0268 |
| 2022/0046528 A1 * | 2/2022 | Yang | ..................... | H04W 72/51 |
| 2022/0279436 A1 * | 9/2022 | Futaki | ................... | H04W 48/20 |
| 2024/0114445 A1 * | 4/2024 | Baek | ...................... | H04W 8/20 |

* cited by examiner

*Primary Examiner* — Jasper Kwoh
(74) *Attorney, Agent, or Firm* — SHOOK, HARDY & BACON L.L.P.

(57) ABSTRACT

Aspects provided herein provide methods, systems, and a non-transitory computer storage media storing instructions for service specific beam optimization. The method begins with receiving a first protocol data unit (PDU) session request from a first user equipment (UE) comprising a request for a first slice. The method also includes determining a first service to allocate to the first UE based on the first slice requested. A first beam is then assigned to the first UE, with the first beam assigned based on the first slice requested. The beams assigned to different types of service may be dynamically changed when usage patterns change as indicated by network data collected.

20 Claims, 5 Drawing Sheets

402 ~ RECEIVING A FIRST SERVICE REQUEST FROM A USER EQUIPMENT (UE) THE FIRST SERVICE REQUEST INDICATING A TYPE OF SERVICE BEING REQUESTED BY THE UE

404 ~ BASED ON THE FIRST SERVICE REQUEST, ASSIGNING A FIRST BEAM TO THE UE.

400

SERVICE SPECIFIC BEAM RADIO FREQUENCY BEAM OPTIMIZATION FOR 5G NETWORKS

BACKGROUND

Advanced antenna systems installed on base stations in a cellular network allow forming and directing multiple beams for multiple users simultaneously. The users may request different types of services including enhanced mobile broadband (eMBB), ultra-reliable low latency communications (URLLC), internet-of-things (IoT), to name a few. Base stations may have defined one type of beam, which is used for all user equipment (UE) requesting service. This can result in poor service for users requesting some types of service and can result in poor user experience. Aspects described herein provide a set of beams configured at a base station that can be used for different services, such as IoT, eMBB, and URLLC. The set of beams can be configured and adjusted according to the 5G network slice being served.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for service specific beam optimization. The method begins when a first protocol data unit (PDU) session request from a first user equipment (UE) is received at a base station. The first PDU session request comprises a request for a first slice. The base station then determines the first service to be allocated to the first UE based on the request for the first slice. The base station then assigns a first beam to the first UE. The first beam is assigned to the UE and is dedicated to a type of service.

In a further embodiment, a system for service specific beam optimization is provided. The system includes a base station with antennas for receiving protocol data unit (PDU) session requests from a first user equipment (UE) and for transmitting downlink data to the first UE. The system also includes a processor which is configured to receive a first PDU session request from the first UE. The first PDU session request contains a request for a first slice. A first service is allocated to the first UE based on the first slice requested. The base station then determines a first service requested by the first UE, with the request for the first slice determining the first service. The first beam is then assigned to the first UE based on the first slice requested. The first slice is served by a dedicated first beam.

An additional embodiment provides a non-transitory computer storage media storing computer-useable instructions that, when executed by one or more processors cause the processors to transmit a first protocol data unit (PDU) session request from a first user equipment (UE) to a base station. The first PDU session request contains a request for the first slice. The first UE then receives a downlink message from the base station which comprises a first beam. The first beam is dedicated to a first type of service.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
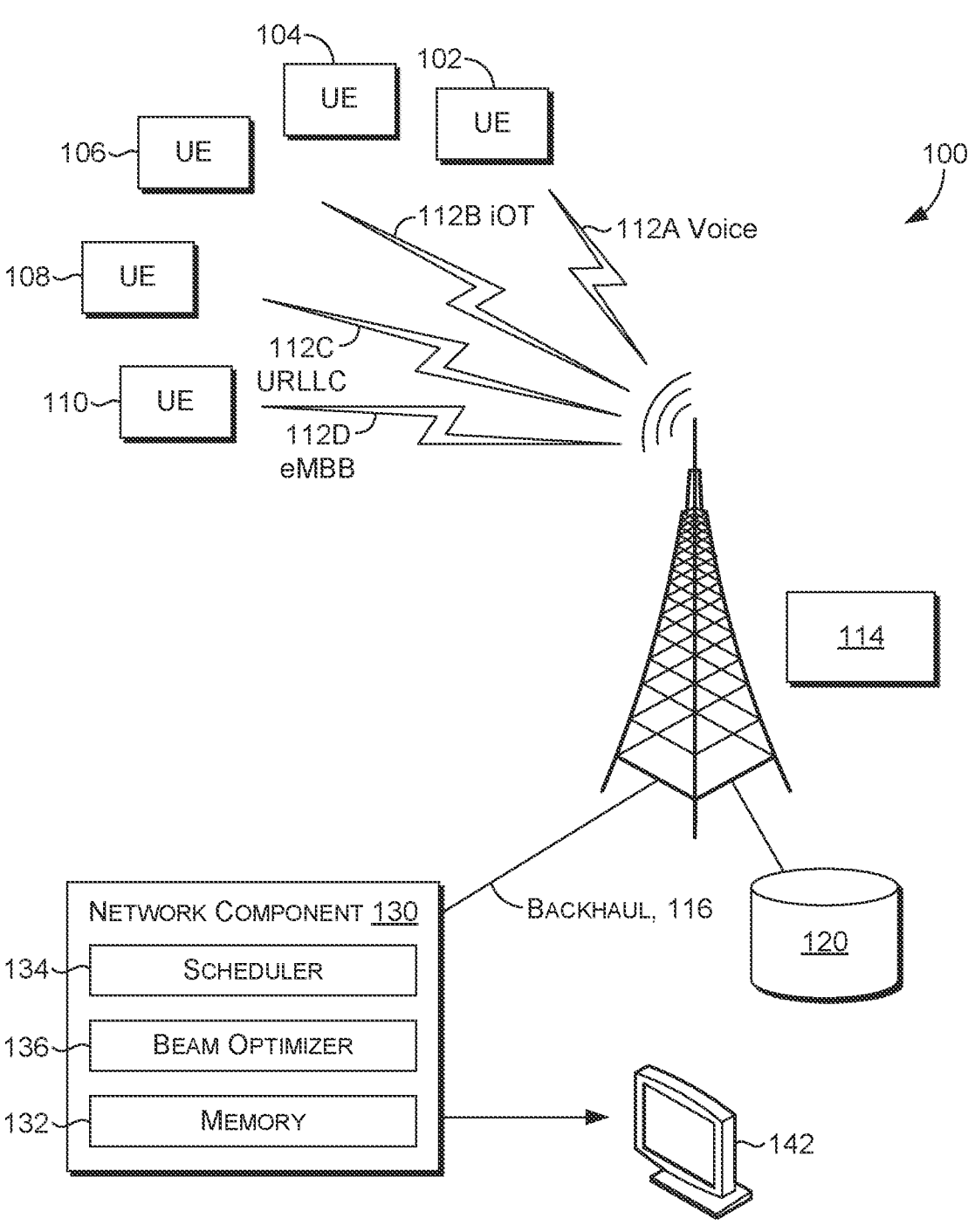
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Signal Received Power
RSRQ Reference Signal Received Quality
RSSI Received Signal Strength Indicator
SINR Signal-to-Interference-Plus-Noise Ratio
SNR Signal-to-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable
   with UE)

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 600 described herein with respect to FIG. 5.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method for service specific beam optimization. The method begins when a first protocol data unit (PDU) session request from a first user equipment (UE) is received at a base station. The first PDU session request comprises a request for a first slice. The base station then determines the first service to be allocated to the first UE based on the request for the first slice. The base station then assigns a first beam to the first UE. The first beam is assigned to the UE and is dedicated to a type of service. Based on usage data collected by the base station, the base station may periodically reassign slices to specific beams.

A second aspect of the present disclosure provides a system for service specific beam optimization. The system includes a base station with antennas for receiving protocol data unit (PDU) session requests from a first user equipment (UE) and for transmitting downlink data to the first UE. The system also includes a processor which is configured to receive a first PDU session request from the first UE. The first PDU session request contains a request for a first slice. A first service is allocated to the first UE based on the first slice requested. The base station then determines a first service requested by the first UE, with the request for the first slice determining the first service. The first beam is then assigned to the first UE based on the first slice requested. The first slice is served by a dedicated first beam.

Another aspect of the present disclosure is directed to a non-transitory computer storage media storing computer-useable instructions that, when used by one or more processors, cause the processors to transmit a first protocol data unit (PDU) session request from a first user equipment (UE) to a base station. The first PDU session request contains a request for the first slice. The first UE then receives a downlink message from the base station which comprises a first beam. The first beam is dedicated to a first type of service.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Network environment 100 includes user equipment (UE) devices 102, 104, 106, 108, and 110, base station 114 (which may be a cell site or the like), and one or more communication channels 112 A-D. The communication channels 112 A-D can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device (500) that communicates via wireless communications with the base station 114 in order to interact with a public or private network.

Figure 5:
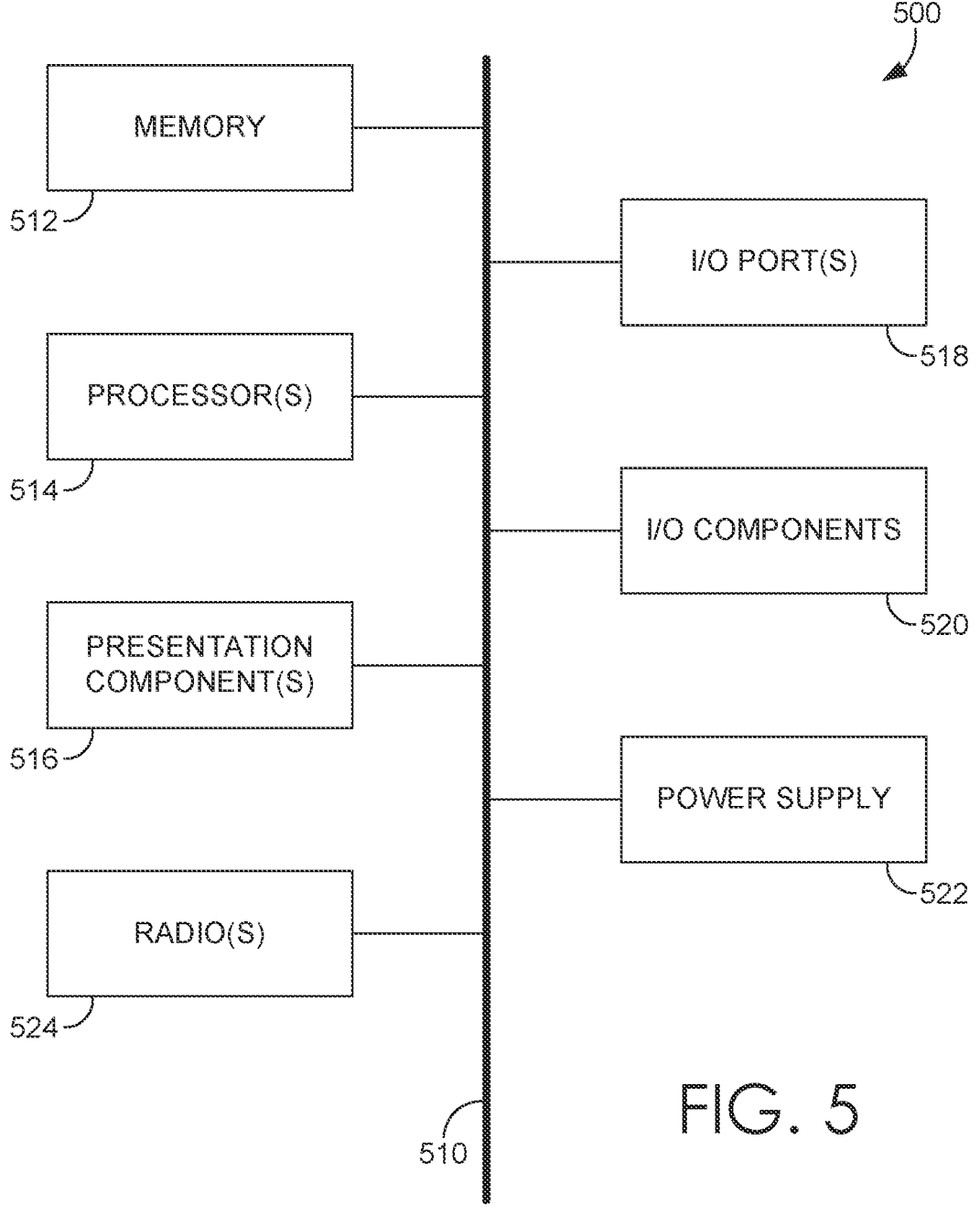
FIG. 5 depicts an exemplary computing device suitable for use in implementations of the present disclosure, in accordance with aspects herein.

In some aspects, each of the UEs 102, 104, 106, 108, and 110 may correspond to computing device 500 in FIG. 5. Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 A-D to communicate with other computing devices (e.g., a mobile device(s), a server(s), a personal computer(s), etc.) through base station 114. Base station 114 may be a gNodeB in a 5G or 6G network. The communication channels 112 A-D can include communication channel 112 A which is a voice channel, communication channel 112 B, which can be used for communication with internet-of-things (IoT) devices, communication channel 112 C which is a ultra-low latency communications (URLLC) channel, and communications channel 112 D which is an enhanced mobile broadband (eMBB) channel.

URLLC communication channel 112 C provides an ultra-reliable and low latency communication service that provides stringent latency with high reliability communications. Networks that offer URLLC services may also offer eMBB services, shown in FIG. 1 as eMBB channel 112 D. Both URLLC and eMBB services have different quality of service (QoS) requirements which can pose scheduling challenges for the base station. The goal of the network operator is to maximize the data rate for the eMBB service while meeting the latency requirements of the URLLC service.

The data rate for the eMBB service arises from the nature of the eMBB service. The eMBB service is used to provide 8K streaming services that can be used for immersive virtual reality (VR) experiences. Providing a seamless virtual reality experience involves using a high wireless bandwidth with low latency. The eMBB service defines a service category that defines a minimum data transfer rate. High bandwidth applications like 8K video or 360 VF are sensitive to network performance with any interruption significantly affecting the user's experience. In VR applications delay between action and response can result in a user experiencing motion sickness with nausea resulting when latency exceeds 20 ms.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 A-D can be part of a telecommunication network that connects subscribers to their immediate telecommunications service provider (i.e., home network carrier). In some instances, the one or more communication channels 112 A-D can be associated with a telecommunications provider that provides services (e.g., 3G network, 4G network, LTE network, 5G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 A-D can comprise, for example, a 1× circuit voice, a 3G network (e.g., CDMA, CDMA2000, WCDMA, GSM, UMTS), a 4G network (WiMAX, LTE, HSDPA), or a 5G network or a 6G network, eMBB, IoT, and URLLC.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the base station 114. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

5G and 6G networks are designed to provide ultra-reliable and low latency communications (URLLC) and eMBB communications. 5G uses synchronization signal blocks (SSB) that are transmitted in four orthogonal frequency division multiplexing (OFDM) symbols across 240 carriers in pre-defined bursts across the time domain on the configured physical resource blocks (PRB). One PRB spans 12 subcarriers, which with the 15 kHz subcarrier spacing correspond to 180 kHz.

Synchronization signal blocks (SSBs) are the specific signals sent to the UEs, such as the UEs 102, 104, 106, 108, and 110 in FIG. 1. The UEs 102, 104, 106, 108, and 110 are aware of the SSBs and measure the SSBs for acquisition of the cell site, if initially moving into the area served by the cell. UEs may also measure after acquisition when in active mode. When measuring in active mode the UEs may measure for mobility based on the SSBs. The SSBs are configured at the base station. Aspects discussed herein provide to configuring SSBs according to the 5G slice being served and the configuration of the communications channels 112 A-D can be dynamically adjusted based on the network slices being served.

5G Network slicing is a network architecture that enables multiplexing of virtualized and independent logical networks on the same physical network infrastructure. Each network slice is an isolated end-to-end network tailored to meet the requirements of a particular application. Slicing allows network operators to create network slices to support specific applications such as URLLC, IoT, and eMBB. The network can be adjusted logically according to the slice being served. The slice concept can be extended to provide a set of SSBs configured to serve one slice with another set of SSBs configured to serve a second slice. The communication services provided in the first slice can be different from the communication services provided in the second slice. The slices can be served by a beam dedicated to the particular service with all UEs requesting that service served by the same beam of the base station 114.

The network component 130 comprises a memory 132, a scheduler 134, and a beam optimizer 136. All determinations, calculations, and data further generated by the scheduler 134 and the beam optimizer 136 may be stored at the memory 132 and also at the data store 140. Although the network component 130 is shown as a single component comprising the memory 132, the scheduler 134, and the beam optimizer 136, it is also contemplated that each of the memory 132, scheduler 134, and beam optimizer 136 may reside at different locations, be its own separate entity, and the like, within the home network carrier system.

The network component 130 is configured to retrieve signal information, UE device information, latency information, including quality of service (QoS) information, and metrics from the base station 114 or one of the UE devices 102, 104, 106, 108, and 110. UE device information can include a device identifier and data usage information. The scheduler 134 and the beam optimizer 136 can receive requests for particular services such as IoT, eMBB, URLLC, internet, and voice, as well as signal condition measurements and power levels from the UEs 102, 104, 106, 108, and 110. The scheduler 134 and the beam optimizer 136 can be located in a central office or other centralized location for a virtualized radio access network. For a distributed radio access network, the scheduler 134 and the beam optimizer 136 can be located at the base station 114. The base station 114 may be a gNodeB that interfaces with the beam optimizer 136 and scheduler 134.

The UE, which may be any one of UEs 102, 104, 106, 108, and 110 sends an uplink message over one of the communication channels 112 A-D. The uplink message may be a protocol data unit (PDU) session request. PDU sessions provide connectivity between applications on a UE and a data network through the user plane function. (UPF). The PDU session request session establishment message is sent by the UE, which can be any one of the UEs 102, 104, 106, 108, and 110 to the base station 114. In the PDU session request session establishment message the UE specifies the slice the UE wishes to use. The UE 108 can send a PDU session request session establishment message to the base station 114 and the request specifies the slice. As shown in FIG. 1, UE 108 is requesting to use communication channel 112 C, for URLLC service, which is provided by a beam dedicated to URLLC service. The base station 114 may have voice service as slice 1, IoT service as slice 2, URLLC service as slice 3, and eMBB service as slice 4. These are provided as examples, and further service types may be added without exceeding the scope of the disclosure.

The base station 114 can adjust the beams according to the slice requested. When adjusting the beams base station 114 considers all of the UEs making the same service type request. For example UE 104 may also make a request for URLLC service using communication channel 112 C, which is the same slice requested by UE 110. Both UE 104 and 110 will be served by the same beam from base station 114. The number of UEs served by a particular slice will be limited by the number of UEs the base station 114 can support. The allocation of slices to beams can be dynamically adjusted after the base station 114 learns the slices being served. A dynamic adjust can be made after adding to new slice for a new type of service. A further adjustment can be made as usage data for each slice is collected.

Figure 2:
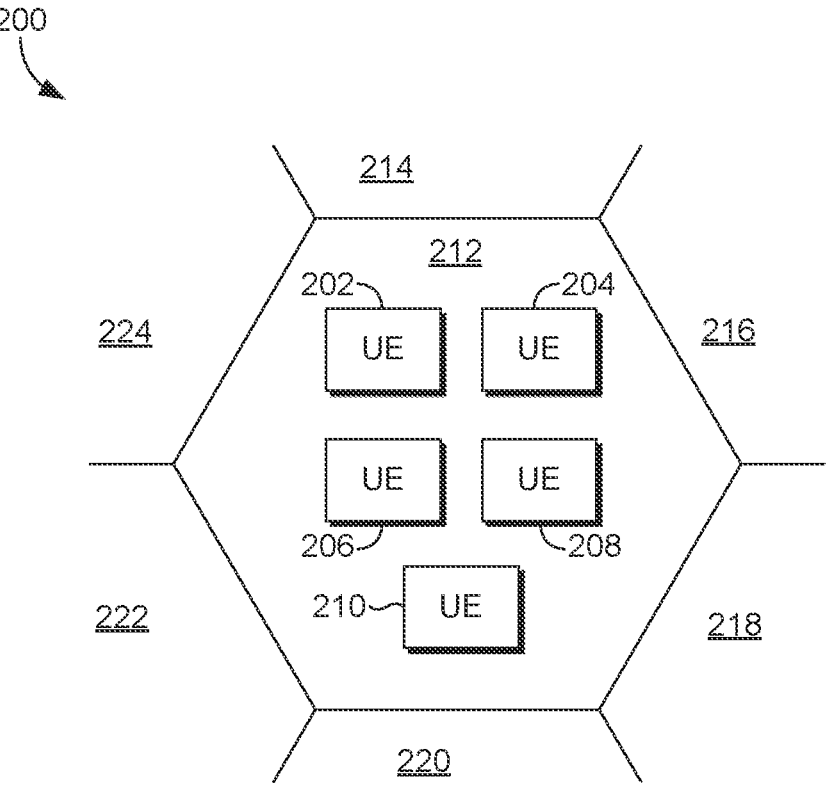
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112 A-D, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell 212 and can move to other cells such as adjoining cells 214, 216, 218, 220, 222 and 224.

Figure 3:
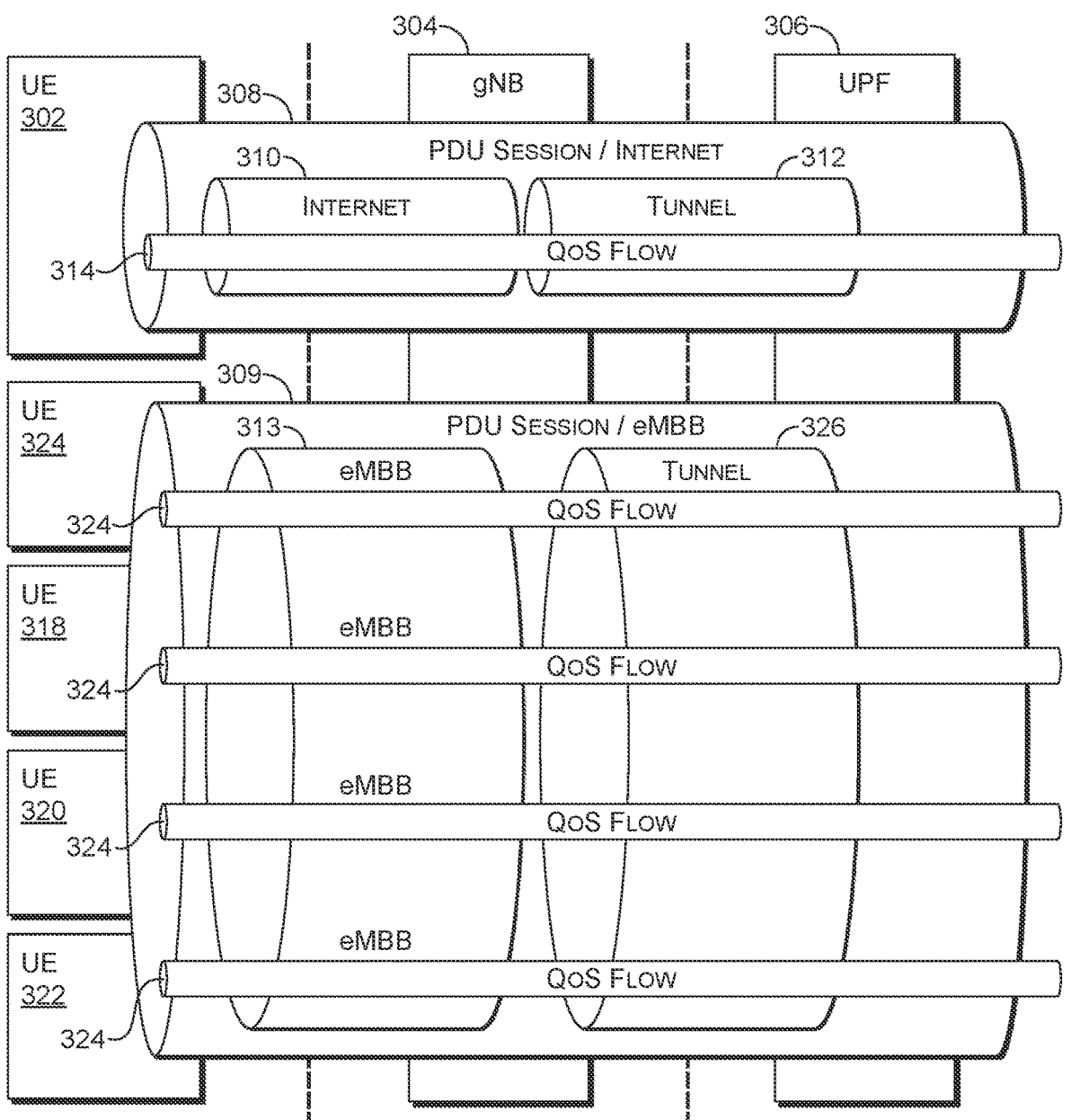
FIG. 3 depicts a service specific beams optimized for a 5G network, in which implementations of the present disclosure may be employed, in accordance with aspects herein.

FIG. 3 depicts a service specific beams optimized for a 5G network in accordance with aspects discussed herein. The beam collection 300 provides multiple beams to UEs on the network. A first UE 302 is accessing the internet through a base station, shown as gNB 304. The gNB 304 provides the UE 302 access to the UPF 306. The UE 302 is served by a first slice 308 that is dedicated to internet service. The UE 302 is served by a beam 314 that is provided through a tunnel 312 that accesses the internet 310. Other UEs served by the same gNB 304 that request internet service will also be served by the beam 314.

Other UEs such as UEs 316, 318, 320, and 322 are accessing eMBB session through tunnel 313 through the gNB 304. The gNB 304 provides the UEs 316, 318, 320, and 322 access to the UPF 306. The UE 316 is served by a second slice 309 that is shared among UEs 316, 318, 320, and 322. The second slice is dedicated to eMBB service. The UE 316 is served by a beam 324 that is also provided to UEs 318, 320, and 322. The beam 324 can be provided through an eMBB tunnel 313 that is connected with tunnel 326. The eMBB tunnel 313 can be a service specific application that is accessed through tunnel 326.

Figure 4:
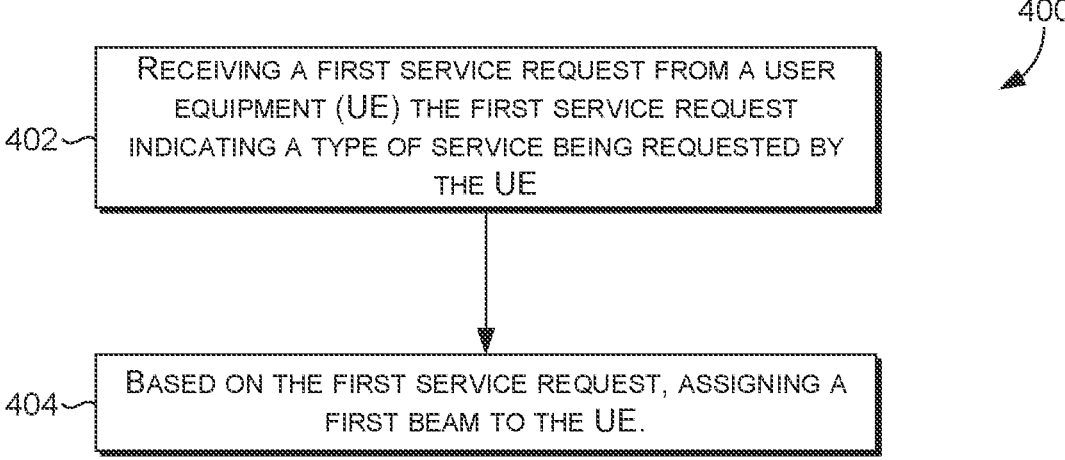
FIG. 4 is a flow diagram of a method for service specific beam optimization, in which aspects of the present disclosure may be employed, in accordance with aspects herein.

FIG. 4 is a flow diagram of a method for service specific beam optimization, in which aspects of the present disclosure may be employed, in accordance with aspects herein. The method 400 begins in step 402 with receiving a first protocol data unit (PDU) session request from a first user equipment (UE). The first PDU session request includes a request for a first slice. Next, in step 404, the method continues with determining a first service to allocate to the first UE based on the first slice requested. The first slice may be dedicated to a particular service, such as voice, video, IoT, URLLC, or eMBB, among others. Each slice may be dedicated to a particular type of service and can be served by a dedicated beam.

The method continues in step 406 with assigning a first beam to the first UE, the first beam assigned based on the first slice requested. The beam assignments may be dynamically adjusted by the base station based on usage data collected on a periodic basis. Over time the beams assigned to a particular type of service may change.

FIG. 5 depicts an exemplary computing device suitable for use in implementations of the present disclosure, in accordance with aspects herein. With continued reference to FIG. 5, computing device 500 includes bus 502 that directly or indirectly couples the following devices: memory 504, one or more processors 506, one or more presentation components 508, input/output (I/O) ports 512, I/O components 510, radio 516, transmitter 518, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 510. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 510. One or more presentation components 508 present data indications to a person or other device. Exemplary one or more presentation components 508 include a display device, speaker, printing component, vibrating component, etc. I/O ports 512 allow computing device 500 to be logically coupled to other devices including I/O components 510, some of which may be built into computing device 500. Illustrative I/O components 510 include a microphone, joystick, game pad, satellite dish, scanner, printer, wireless device, etc.

The radio 516 represents one or more radios that facilitate communication with a wireless telecommunications network. While a single radio 516 is shown in FIG. 5, it is contemplated that there may be more than one radio 516 coupled to the bus 502. In aspects, the radio 516 utilizes a transmitter 518 to communicate with the wireless telecommunications network. It is expressly conceived that a computing device with more than one radio 516 could facilitate communication with the wireless telecommunications network via both the first transmitter 518 and an additional transmitters (e.g. a second transmitter). Illustrative wireless telecommunications technologies include CDMA, GPRS, TDMA, GSM, and the like. The radio 516 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for service specific beam optimization, the method comprising:

receiving a first protocol data unit (PDU) session request from a first user equipment (UE) comprising a request for a first slice;

determining a first service to allocate to the first UE based on the first slice;

identifying a first beam for the first UE, wherein the first beam is dynamically identified based on both the first slice and real-time usage data collected for the first slice;

assigning the first beam to the first UE, the first beam assigned based on the first slice; and periodically reassessing the first beam assigned to the first UE based on the real-time usage data collected for the first slice, wherein beams assigned to a type of service associated with the first slice are changed based on updated real-time usage data.

2. The method of claim 1, wherein the first beam assigned to the first UE is dedicated to the first slice.

3. The method of claim 1 further comprising receiving a second PDU session request from a second UE, wherein the second PDU session request requests the first slice.

4. The method of claim 3 further comprising determining that both the first UE and the second UE requested the first service.

5. The method of claim 1, wherein the first beam is assigned to the first slice based on the first service.

6. The method of claim 5, further comprising reassigning the first beam dedicated to the first slice based on usage data collected for the first slice.

7. The method of claim 1, further comprising receiving a second PDU session request from a second UE, wherein the second PDU session request identifies a second slice.

8. The method of claim 7, further comprising assigning a second beam to the second UE, wherein the second beam is dedicated to the second slice.

9. The method of claim 7, wherein the second beam assigned to the second slice is dedicated to the second slice.

10. A system for service specific beam optimization, comprising:

a base station having one or more antennas for receiving protocol data units (PDU) session requests from a first UE and for transmitting downlink data to the first UE, and a processor, the processor configured to:

receive a first PDU session request from the first UE, the first PDU session request comprising a first request for a first slice;

based on the first slice, determine a first service to allocate to the first UE;

assign a first beam to the first UE, wherein the first beam is dynamically identified based on both the first slice and real-time usage data collected for the first slice; and periodically reassessing the first beam assigned to the first UE based on the real-time usage data collected for the first slice, wherein beams assigned to a type of service associated with the first slice are changed based on updated real-time usage data.

11. The system of claim 10, further comprising receiving a second PDU session request from a second UE, the second PDU request containing a second request for the first slice.

12. The system of claim 11, further comprising determining that both the first UE and the second UE requested the first service.

13. The system of claim 12, further comprising assigning the first beam assigned to the first service to the first UE and the second UE.

14. The system of claim 10, further comprising receiving a second PDU session request from a second UE, wherein the second PDU session request contains a second request for a second slice.

15. The system of claim 14, further comprising assigning a second beam to the second slice based on a second service.

16. The system of claim 15, wherein the second beam assigned to the second slice is dedicated to a second service.

17. The system of claim 10, further comprising adjusting a beam dedication based on collected data for the first slice.

18. A non-transitory computer storage media storing computer-useable instructions that, when used by one or more processors, cause the processors to:

transmit a first protocol data unit (PDU) session request message from a first user equipment (UE) to a base station, the first PDU session request containing a first request for a first slice;

receive a downlink message from the base station at the first UE, the downlink message comprising an indication of a first beam that is dynamically identified based on both the first slice and real-time usage data collected for the first slice; and receive an updated downlink message from the base station at the first UE indicating a changed beam assignment, wherein the changed beam assignment is based on updated real-time usage data collected for the first slice.

19. The non-transitory computer storage media of claim 18, wherein the first beam is dedicated to the first slice and a first service.

20. The non-transitory computer storage media of claim 18, further comprising transmit a second PDU session request from the first UE to the base station, the second PDU session request containing a second request for a second slice, the second slice dedicated to a second service.

* * * * *